United States Patent [19]

Pierrot, III et al.

[11] 4,417,759

[45] Nov. 29, 1983

[54] GRAPPLE PIVOT JOINT WITH SWING DAMPENER

[75] Inventors: Victor C. Pierrot, III; Gerald J. Ihm, both of Dubuque, Iowa

[73] Assignee: Deere & Company, Moline, Ill.

[21] Appl. No.: 300,095

[22] Filed: Sep. 8, 1981

[51] Int. Cl.[3] .......................... B66C 1/00; F16F 7/04

[52] U.S. Cl. .......................... 294/86 R; 188/83

[58] Field of Search .................. 294/86 R, 70, 82 R, 294/106; 37/183 R; 188/83, 130, 381; 403/113, 120, 146; 414/626, 732–735, 738–740

[56] References Cited

U.S. PATENT DOCUMENTS

| | | | |
|---|---|---|---|
| 1,088,450 | 2/1914 | Richards | 188/130 |
| 1,108,663 | 8/1914 | Ashman | 188/130 X |
| 3,168,874 | 2/1965 | Atanasoff | 188/83 X |
| 3,301,587 | 1/1967 | Heikkinen | 294/67 |
| 4,335,914 | 6/1982 | Korbel | 294/86 R |

OTHER PUBLICATIONS

Adv. brochure referring to ESCO Model 26 Grapple.
ESCO Catalog Supplement 1 (unnumbered and undated pages), bearing hand-written date of May 1978.

*Primary Examiner*—Johnny D. Cherry

[57] ABSTRACT

A suspension for a grapple includes a swivel link coupled between a support boom and ahead of the grapple for permitting the latter to undergo swinging movement about first and second pivot axes arranged crosswise to each other. At each pivot axis, there is a pivot pin having a brake associated therewith.

5 Claims, 4 Drawing Figures

FIG. 1
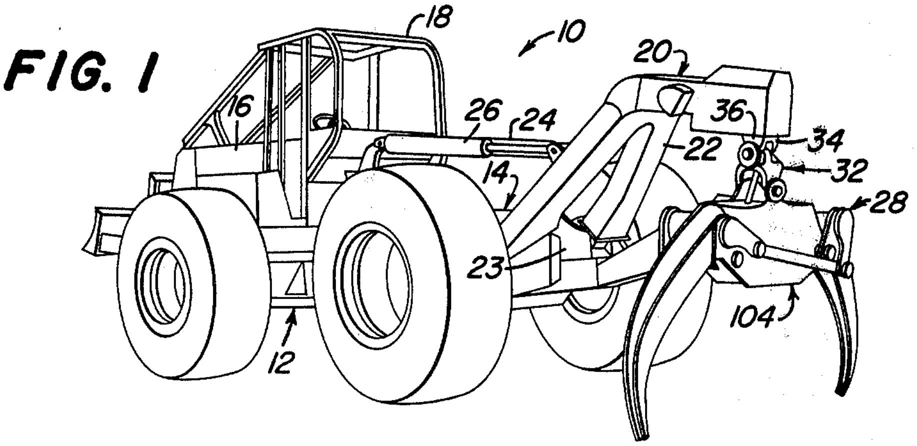
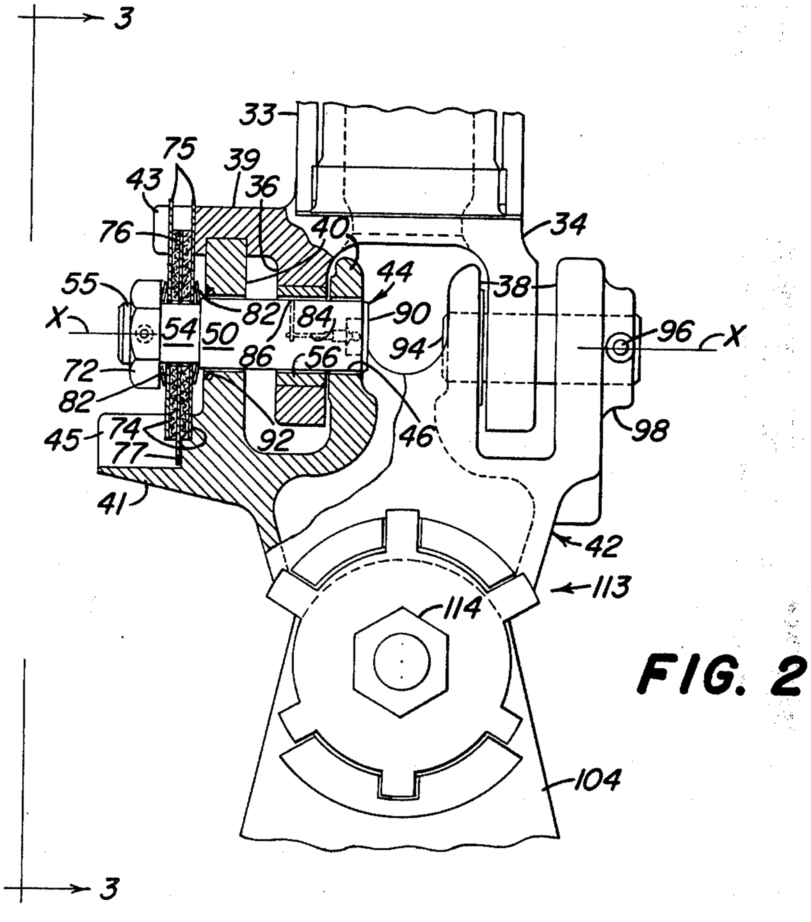
FIG. 2

GRAPPLE PIVOT JOINT WITH SWING DAMPENER

BACKGROUND OF THE INVENTION

The present invention relates to forestry grapples and more specifically, to pivot joint structures for suspending grapples from support booms.

It is known to suspend grapples from support booms by means of pivot joint structures which permit the grapple to swing about separate horizontal axes located crosswise to each other. One problem with such suspensions is that when the vehicle carrying the grapple is operated over rough terrain while the grapple is empty, the grapple flops wildly about these axes and sometimes comes into contact with the support boom or other vehicle structure which may result in damage to the grapple, boom and/or other structure.

To overcome the problem of grapple flop, it is known in the prior art to provide grapple pivot structures with various types of friction brakes which inhibit such flop. These friction brakes suffer from one or more of the drawbacks of requiring frequent adjustment, of requiring the joint structure to be disassembled for servicing brake parts, and of lacking flexibility for modifications for changing braking capacity.

SUMMARY OF THE INVENTION

According to the present invention, there is provided an improved braking means embodied in a grapple pivot joint structure.

A broad object of the invention is to provide a grapple pivot joint structure which embodies a brake constructed so as to overcome the aforementioned drawbacks of the prior art.

More specifically, it is an object of the invention to provide a grapple pivot structure including brakes having friction elements located at the outer ends of the pivot pins of the axes so as to be replaceable without disassembling the pins.

These and other objects will become apparent from a reading of the description together with the appended drawings.

BRIEF DESCRIPTION OF THE DRAWINGS

FIG. 1 is a left rear perspective view of a forestry grapple skidder having a grapple suspended from a boom by a pivot joint structure embodying friction brakes constructed in accordance with the principles of the present invention.

FIG. 2 is a side elevational view of the grapple suspension taken along a first pivot axis and having a portion of the pivot joint structure of the second pivot shown in vertical section so as to show the interior of one of the brakes.

DESCRIPTION OF THE PREFERRED EMBODIMENT

Figure 3:
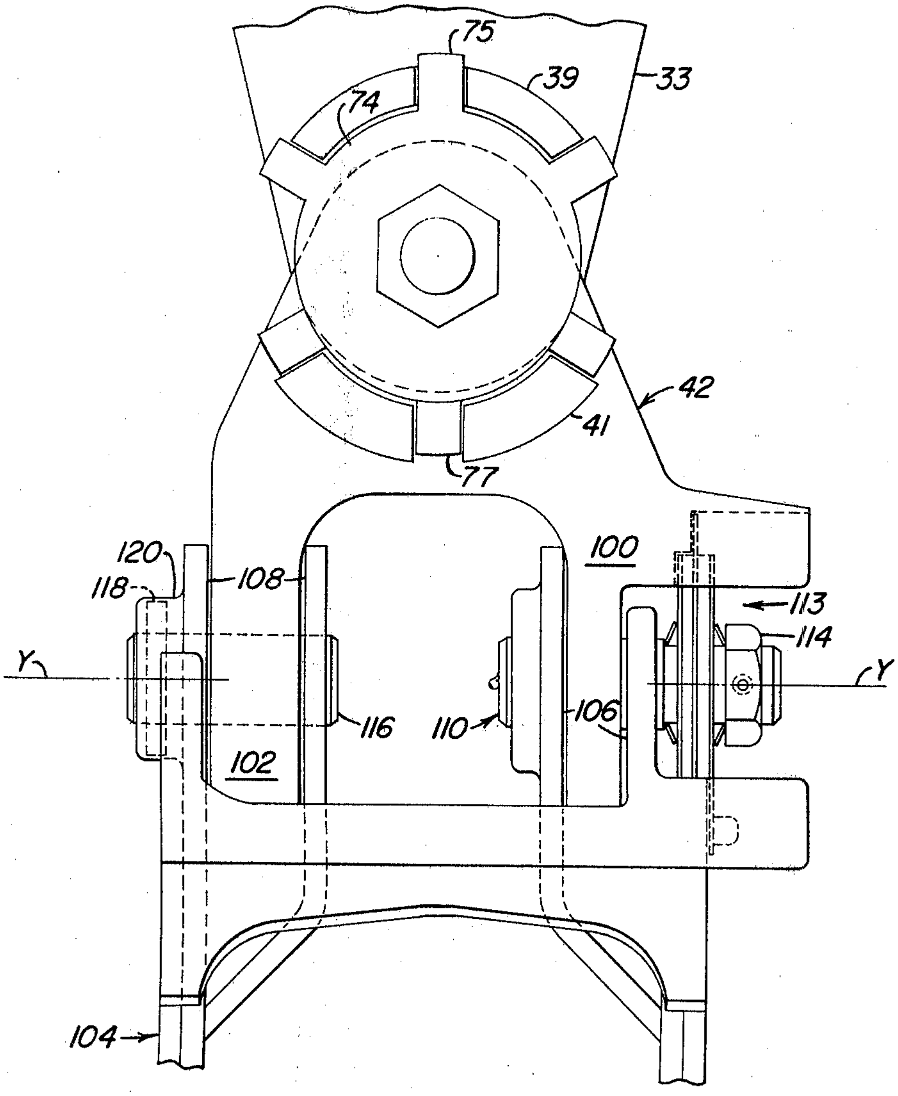
FIG. 3 is a side elevational view taken of the grapple suspension taken along the second pivot.

Referring now to FIG. 1, therein is shown a grapple skidder 10 including front and rear wheel-supported frame sections 12 and 14, respectively interconnected by a vertical pivot assembly (not shown). The front frame section carries an engine enclosed at 16 and an operator's station with attendant controls at a location 18 rearwardly of the enclosed engine.

The rear frame section has a grapple structure 20 mounted thereon. Specifically, the grapple structure 20 includes an inverted Y-shaped support boom 22 having an inner or lower end defined by a pair of transversely spaced legs connected to the frame section 14, as at 23, (only right side visible) for swinging vertically about a horizontal transverse axis. Hydraulic actuators 24 and 26 are connected between the frame section 14 and the boom 22 for controlling the vertical movement of the latter. A grapple 28 is suspended from the upper or outer end of the boom 22 by a suspension 32 which incorporates the present invention.

As can best be seen in FIGS. 2 and 3, the boom 22 carries an upright shaft 33 having a pair of transversely spaced depending lugs 34 and 36 at its lower end and respectively located between upwardly projecting lugs 38 and lugs 40, the lugs 38 and 40 forming part of a swivel link 42. Each of the lugs 34, 36, 38 and 40 is provided with a bore and these bores are arranged in alignment with each other along a first horizontal axis X—X.

Located in the bore means defined by the bores in the lug 36 and the set of lugs 40, is a pivot pin 44. The pivot pin 44 has a series of sections. Specifically, the pin 44 includes an inner bearing section 46 followed by a bearing section 50, and decreased diameter outer section 54 and threaded outer section 55. The inner bearing section 46 is pressed into the bores of lugs 40 and rotatably received in a bushing 56 pressed into the bore of lug 36.

Lug 36 additionally includes an annular outwardly projecting partial rim 39 disposed coaxially with the pin 44. The outer lug 40 additionally includes an annular outwardly projecting partial rim 41 disposed coaxially with the pin 44 generally opposite to rim 39. Rims 39 and 41 each have a radially arched extension of approximately 45 degrees. Each rim 39 and 41 has a channel 43 and 45, respectively, therein.

Located generally within the rims 39 and 41 and around pin section 54 is a stack of brake disks including a first pair of disks 74 having friction material fixed to opposite faces thereof and a second disk 76 which serves as pressure plate placed between disks 74. The disks 74 have tabs 75. One of the tabs 75 is placed in channel 45 such that the remaining two tabs 75 abut respective sides of rim 39. In like manner, the disk 76 has tabs 77 mounted such that one of the tabs 77 is placed in channel 45 and the remaining two tabs abut respective sides of rim 39. Mounted opposite each disk 74 on the narrow section 54 is a Belleville spring 82. When the nut 72 is tightened, the Belleville spring 82 is deflected by nut 72 and side face of pin section 50, so as to maintain the stack of brake disks 74 and 76 in biased engagement with each other to thereby maintain a constant braking action resisting swinging movement of the swivel joint 42 about the axis X—X. It is observed that the friction material may be free floating on pin 44.

A lubricant passage 84 is located in the pin 44 and includes an opening 86, which conveys lubricant to the bushing 56. A grease fitting 90 at the inner end of the pin 44 is screwed into an axial portion of the passage 84.

The mounting of the swivel joint 42 to the shaft 33 is completed by a pivot pin 94, which is received in a bore means located on the axis X—X and defined by bores provided in the lug 34 and set of lugs 38. The pivot pin 94 is held in place by a retaining pin 96 which extends through a drilled passage provided in a boss 98 formed integrally with the outer one of the set of lugs 38 and a cross passage provided in an outer portion of the pin 94.

It is to be understood that in cases where additional braking capacity is required, the right side of the swivel joint (FIG. 2) may be modified and a brake assembly of the sort described hereinabove may be used to join the right side of the swivel joint to the shaft 33.

The lower end of the swivel joint 42 is defined, as viewed in FIG. 3, by right- and left-hand lugs 100 and 102. The grapple 28 includes a head or tong support frame 104 defining a right pair of lugs 106 and having the lug 100 disposed therebetween and a left pair of lugs 108 and having the lug 102 disposed therebetween. The lugs 100, 102, 106 and 108 are provided with axially aligned bores arranged along an axis Y—Y disposed crosswise to the axis X—X. Located in the bore means defined by the bores in the lugs 100 and 106 is a pivot pin 110, which is similar in construction and mounted similarly to the pin 44 described hereinabove. The pin 110 is pressed into lugs 106 of the grapple head 104. A brake assembly 113 is constructed similarly to the sets of disks 74 and 76 described above.

The bore means defined by the bores in the lugs 102 and 108 have a pivot pin 116 received therein and held in place by a locking pin 118 received in a cross bore in the left end portion of the pin and in a bore provided in a boss 120 formed integrally with the outer one of the set of lugs 108.

The operation of the grapple suspension is a follows. During transport of the grapple skidder 10 in the forest, when the grapple 28 is unloaded as shown in FIG. 1, the tires in following uneven terrain and in passing over obstacles such as logs and boulders will create motion in the rear frame section 14 which will tend to effect swinging of the grapple about the axes X—X and Y—Y. Motion about the axis X—X is frictionally resisted by the stack of brake disks 74 and 76 which are loaded into engagement with each other by the Belleville spring 82 so that motion which does occur is very slow. Motion about the axis Y—Y is similarly frictionally resisted. The frictional resistance to motion about the axis of X—X and Y—Y may be changed, as desired, by varying the order and number of disks 74 and 76 to provide different combinations of friction surfaces.

In the event that the motion about the axes X—X and Y—Y is not sufficiently restrained by a given pivot pin and associated brake structure, a pivot pin having a longer outer end portion may be used along with additional disks 74 and 76 for added capacity. Additional braking load can also be achieved by stacking more than one Belleville spring 82.

Another way of providing additional braking capacity would be to provide a suspension wherein the pin 94 on the axis X—X and the pin 116 on the axis Y—Y are respectively replaced by a pivot pin and associated friction brake constructed similarly to the pins 44 and 110 and their associated friction brakes.

In the event that the brake disks of the grapple suspension 32 should become worn to the extent that adequate braking no longer occurs, the disks may be easily replaced without necessitating the removal of the pins 44 or 110. For example, with reference to FIG. 2, it can be seen that the disks 74 and 76 may be replaced by merely removing the nut 72 and Belleville spring to take out the worn disks 74 and 76. New disks 74 and 76 may then be installed in place and the nut 72 and Belleville spring reinstalled. As the nut 72 is being tightened, the Belleville spring 82 moves from its illustrated uncompressed to its fully compressed position.

Figure 4:
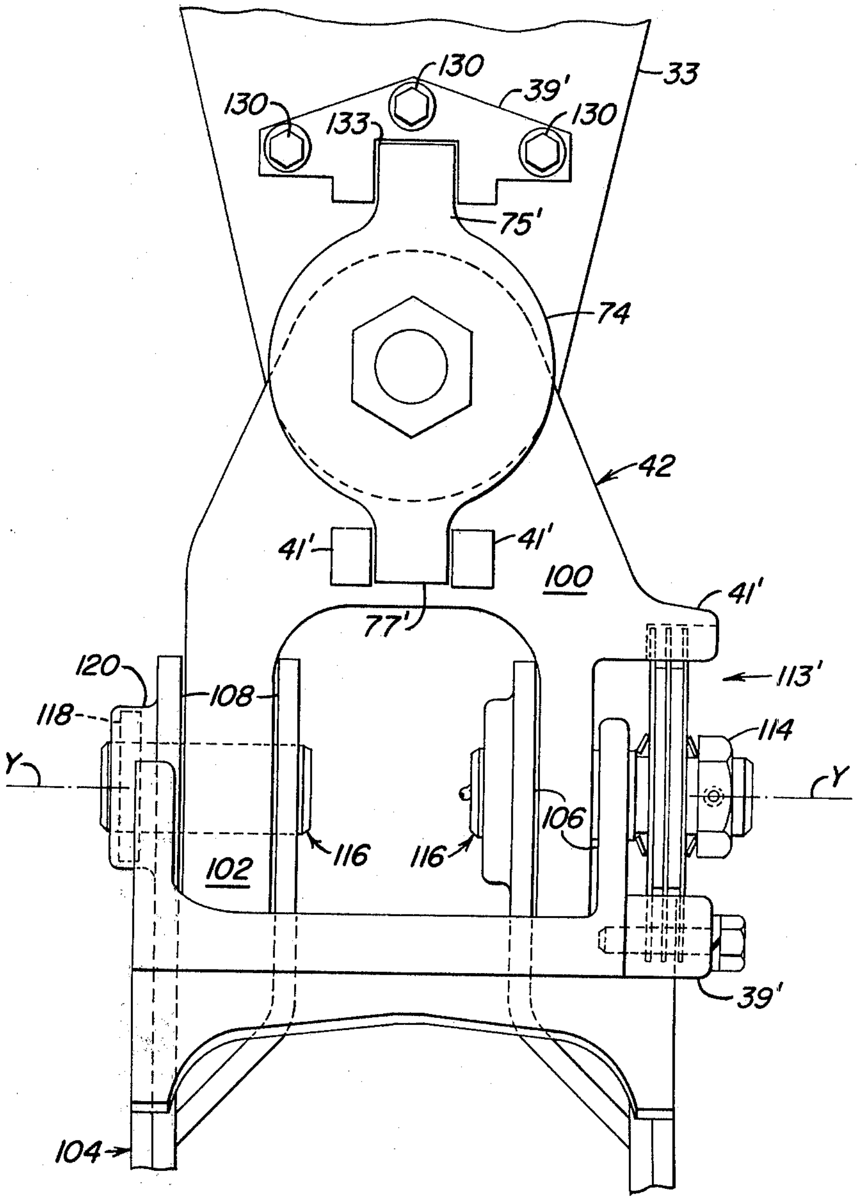
FIG. 4 is a side elevational view of an alternative embodiment for a grapple pivot joint with swing dampener in accordance with the present invention.

Referring to FIG. 4, an alternative brake mounting system includes an anchor rim 39' having a formed channel 133 fixably mounted to shaft 33 by any conventional means such as by bolts 130. A first set of formed rims 41' are formed in swivel link 42 in a spaced apart alignment. The brake disks are stuck along pin section 54 as previously described, however the disks 74 and 76 are modified to have a single tab 75' and 77' to be received by channel 133 and between formed rims 41', respectively. The brake assembly 113' is constructed similarly.

I claim:

1. In a pivot joint incorporating a friction brake having a first and second member respectively defining first and second axially aligned bores, a pivot pin non-rotatably received in said first bore and rotatably received in said second bore, means for maintaining said pivot pin, wherein the improvement comprises: a first and second partial rim generally axially extending radially and oppositely aligned extending from respective said first and second members; said second member includes a pair of lugs provided respectively with a pair of coaxial bores which define the second bore, one of said lugs having said second partial rim extending therefrom, said second rim having a formed channel therein, said first member including a lug disposed between said pair of lugs and having a first bore in coaxial alignment with said second bores and having said first partial rim extending axially therefrom, said first rim having a formed channel; said pivot pin having a portion extending through said first and second bores and between said rims; a friction brake located between said first and second partial rims and around said pivot pin including at least one brake disk having at least one tab extending radially therefrom and received in said channel of said first rim, at least one pressure plate having at least one tab extending radially therefrom and received in said channel of said second rim, compression means for compressing said brake disk against said pressure plate.

2. A pivot joint as claimed in claim 1 wherein said compression means includes a first Belleville spring placed around a portion of said pivot pin and abutting to said brake disk, a second Belleville spring placed around another portion of said pivot pin abutting to said pressure plate such that said brake disk and said pressure plate are biased together, means for restricting axial movement of said first and second Belleville springs away from said respective friction brake and pressure plate.

3. In a grapple suspension including a swivel link respectively pivotally connected to a support boom and a grapple head by first and second pivot pin means arranged generally crosswise to each other so as to define first and second pivot axes, said first and second pivot pins means respectively being non-rotatably fixed to the support boom and to the swivel link, wherein the improvement comprises; said support boom having a downwardly projecting lug provided with a bore arranged along the first axis and said swivel link having first and second upwardly projecting lugs respectively provided with first and second bores arranged along the first axis; said first pivot pin means including a first pivot pin having first and second bearing surfaces, said second surface received in said first and second bores; said downwardly projecting lug of said support boom includes an axially projecting partial rim having a channel therein; one of said upwardly projecting lugs of said swivel link includes an axially projecting partial rim radially opposed to said rim of said downwardly projecting lug, brake means including a brake disk integrally fixed to said rim of said swivel link and a friction plate integrally fixed to said rim of said support boom.

4. In a grapple suspension as claimed in claim 3 further comprising: said grapple head having an upwardly projecting lug provided with a bore arranged along the second axis and said swivel link having third and fourth downwardly projecting lugs respectively provided with third and fourth bores arranged along the second axis; said second pivot pin means including a first pivot pin having first and second bearing surfaces, said second surface of said second pivot pin means received in said third and fourth bores; said upwardly projecting lug of said grapple head includes an axially projecting partial rim having a channel therein; one of said downwardly projecting lugs of said swivel link includes an axially projecting partial rim radially opposed to said rim of said upward hub, brake means including a brake disk fixed to said rim of said one downwardly projecting lug of said swivel link and a friction plate integrally fixed to said rim of said grapple head.

5. In a grapple suspension as claimed in claims 3 or 4 wherein said brake means comprises a friction brake located between said opposed partial rims including at least one brake disk having at least one tab extending radially therefrom and received in said channel of one of said opposed rims, at least one pressure plate having at least one tab extending radially therefrom and received in said channel of the other of said opposed rims.

* * * * *